United States Patent
Li et al.

(10) Patent No.: US 10,453,477 B2
(45) Date of Patent: *Oct. 22, 2019

(54) METHOD AND COMPUTER SYSTEM FOR PERFORMING AUDIO SEARCH ON A SOCIAL NETWORKING PLATFORM

(71) Applicant: Tencent Technology (Shenzhen) Company Limited, Shenzhen (CN)

(72) Inventors: Lu Li, Shenzhen (CN); Jianxiong Ma, Shenzhen (CN); Li Lu, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 114 days.

This patent is subject to a terminal disclaimer.

(21) Appl. No.: 15/728,464

(22) Filed: Oct. 9, 2017

(65) Prior Publication Data

US 2018/0033450 A1    Feb. 1, 2018

Related U.S. Application Data

(63) Continuation of application No. 15/176,047, filed on Jun. 7, 2016, now Pat. No. 9,818,432, which is a
(Continued)

(30) Foreign Application Priority Data

Jan. 20, 2014    (CN) .......................... 2014 1 0024095

(51) Int. Cl.
*G10L 15/08* (2006.01)
*G10L 25/54* (2013.01)
(Continued)

(52) U.S. Cl.
CPC ............ *G10L 25/54* (2013.01); *G06F 16/433* (2019.01); *G10L 15/14* (2013.01); *G10L 21/10* (2013.01);
(Continued)

(58) Field of Classification Search
None
See application file for complete search history.

(56) References Cited

U.S. PATENT DOCUMENTS 8,504,351 B2    8/2013    Waibel et al.
9,128,926 B2    9/2015    Waibel
(Continued)

FOREIGN PATENT DOCUMENTS

CN    101290768 A    10/2008
CN    101647021 A    2/2010
(Continued)

OTHER PUBLICATIONS

Tencent Technology, ISRWO, PCT/CN2015/070227, Mar. 27, 2015, 8 pgs.
(Continued)

*Primary Examiner* — Abul K Azad
(74) *Attorney, Agent, or Firm* — Morgan, Lewis & Bockius LLP

(57)    ABSTRACT

Methods and computer systems for audio search on a social networking platform are disclosed. While running a social networking application, a computer system receives a first audio input from a user of the computer system and then generates a first audio confusion network from the first audio input. After comparing the first audio confusion network with one or more second audio confusion networks, each corresponding to a second audio input associated with one of a plurality of participants of a chat session of the social networking application, the computer system identifies at
(Continued)

least one second audio input corresponding to the at least one second audio confusion network that matches the first audio confusion network and displays a portion of the chat session including a visual icon representing the identified second audio input on a display of the computer system.

20 Claims, 14 Drawing Sheets

Related U.S. Application Data continuation of application No. PCT/CN2015/070227, filed on Jan. 6, 2015.

(51) Int. Cl.
*G06F 16/432* (2019.01)
*G10L 15/14* (2006.01)
*G10L 21/10* (2013.01)
*G10L 15/02* (2006.01)

(52) U.S. Cl.
CPC .. *G10L 2015/027* (2013.01); *G10L 2015/088* (2013.01)

(56) References Cited

U.S. PATENT DOCUMENTS

| | | | |
|---|---|---|---|
| 9,818,432 B2* | 11/2017 | Li | G10L 15/14 |
| 2009/0172108 A1 | 7/2009 | Singh | |
| 2010/0121642 A1 | 5/2010 | Hori et al. | |
| 2013/0297314 A1 | 11/2013 | Chung et al. | |

FOREIGN PATENT DOCUMENTS

| | | |
|---|---|---|
| CN | 101887725 A | 11/2010 |
| CN | 103514170 A | 1/2014 |
| CN | 104142974 A | 11/2014 |

OTHER PUBLICATIONS

Tencent Technology, IPRP, PCT/CN2015/070227, Jul. 26, 2016, 6 pgs.

* cited by examiner

METHOD AND COMPUTER SYSTEM FOR PERFORMING AUDIO SEARCH ON A SOCIAL NETWORKING PLATFORM

PRIORITY CLAIM AND RELATED APPLICATIONS

This application is a continuation application of U.S. patent application Ser. No. 15/176,047, entitled "METHOD AND COMPUTER SYSTEM FOR PERFORMING AUDIO SEARCH ON A SOCIAL NETWORKING PLATFORM," filed Jun. 7, 2016 which is a continuation of PCT Patent Application No. PCT/CN2015/070227, entitled "METHOD AND COMPUTER SYSTEM FOR PERFORMING AUDIO SEARCH ON A SOCIAL NETWORKING PLATFORM" filed on Jan. 6, 2015, which claims priority to Chinese Patent Application No. 201410024095.0, entitled "METHOD AND DEVICE FOR AUDIO SEARCH" filed on Jan. 20, 2014, all of which are incorporated by reference in their entirety.

TECHNICAL FIELD

The disclosed implementations relate to the field of audio search technologies, and in particular, to a method and a computer system for performing an audio search on a social networking platform.

BACKGROUND

Social networking applications are widely deployed today on different types of computer systems, and there are generally the following two methods for performing an audio search.

In the first method, each target audio input is converted into a corresponding target text input in a word format using an automatic voice transcription technology. Then an index of the target text inputs is created using a text search technology. During a search process, a search term is entered in the text-form, and the search term and each target text input is compared. The target text inputs are sorted according to the extent of similarity, so that a target text input which is most similar to the search term can be found. A target audio input corresponding to the most similar target text input is identified in this way. Alternatively, during the search process, a search is performed using an audio input. The audio input is converted into a corresponding text input, and then the corresponding text input is compared with each target text input. A target audio input corresponding to the target text input that is most similar to the corresponding text input can be identified.

In the second method, each target audio input is converted into a syllable/phoneme sequence. During a search process, a search term entered in text-form or in audio form is converted into a syllable/phoneme sequence. A target audio input which is most similar to the search term can be obtained by calculating and comparing the similarities between syllable/phoneme sequences of the target audio input and the search term.

The foregoing two methods have the same disadvantage: the target audio input, and the search term in text-form or the audio input need to be converted into a word or syllable/phoneme form. Because natural speeches have problems such as varied accents and complex background noise and environments, the voice conversion can be inaccurate, resulting in low accuracy of audio search.

SUMMARY

The implementations of the present disclosure provide methods and computer systems for performing an audio search while running a social networking application.

In some implementations, a method for an audio search is performed at a computer system with one or more processors, a display and memory. The method includes: receiving a first audio input from a user of the computer system; generating a first audio confusion network from the first audio input; comparing the first audio confusion network with one or more second audio confusion networks, wherein a respective second audio confusion network corresponds to a second audio input associated with one of a plurality of participants of a chat session of the social networking application and the user is one of the plurality of participants of the chat session; identifying at least one second audio input corresponding to the at least one second audio confusion network that matches the first audio confusion network; and displaying a portion of the chat session including a visual icon representing the identified second audio input in a first region of the display.

In some implementations, a computer system includes one or more processors, and memory storing one or more programs for execution by the one or more processors. The one or more programs include instructions for performing the operations of any of the methods described herein.

In some implementations, a non-transitory computer readable storage medium store one or more programs. The one or more programs comprise instructions, which, when executed by a computer system, cause the computer system to perform the operations of any of the methods described herein.

Various advantages of the present application are apparent in light of the descriptions below.

BRIEF DESCRIPTION OF THE DRAWINGS

For a better understanding of the aforementioned aspects of the application as well as additional aspects and implementations thereof, reference should be made to the Detailed Description below, in conjunction with the following drawings in which like reference numerals refer to corresponding parts throughout the figures.

Like reference numerals refer to corresponding parts throughout the several views of the drawings.

DETAILED DESCRIPTION

Reference will now be made in detail to implementations, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the implementations.

The technical solutions of the present application are clearly and completely described below with reference to the accompanying drawings. It is obvious that implementations to be described are only a part rather than all of the implementations of the present application. All other implementations obtained by a person of ordinary skill in the art based on the implementations of the present application without creative efforts shall fall within the protection scope of the present application.

Figure 1:
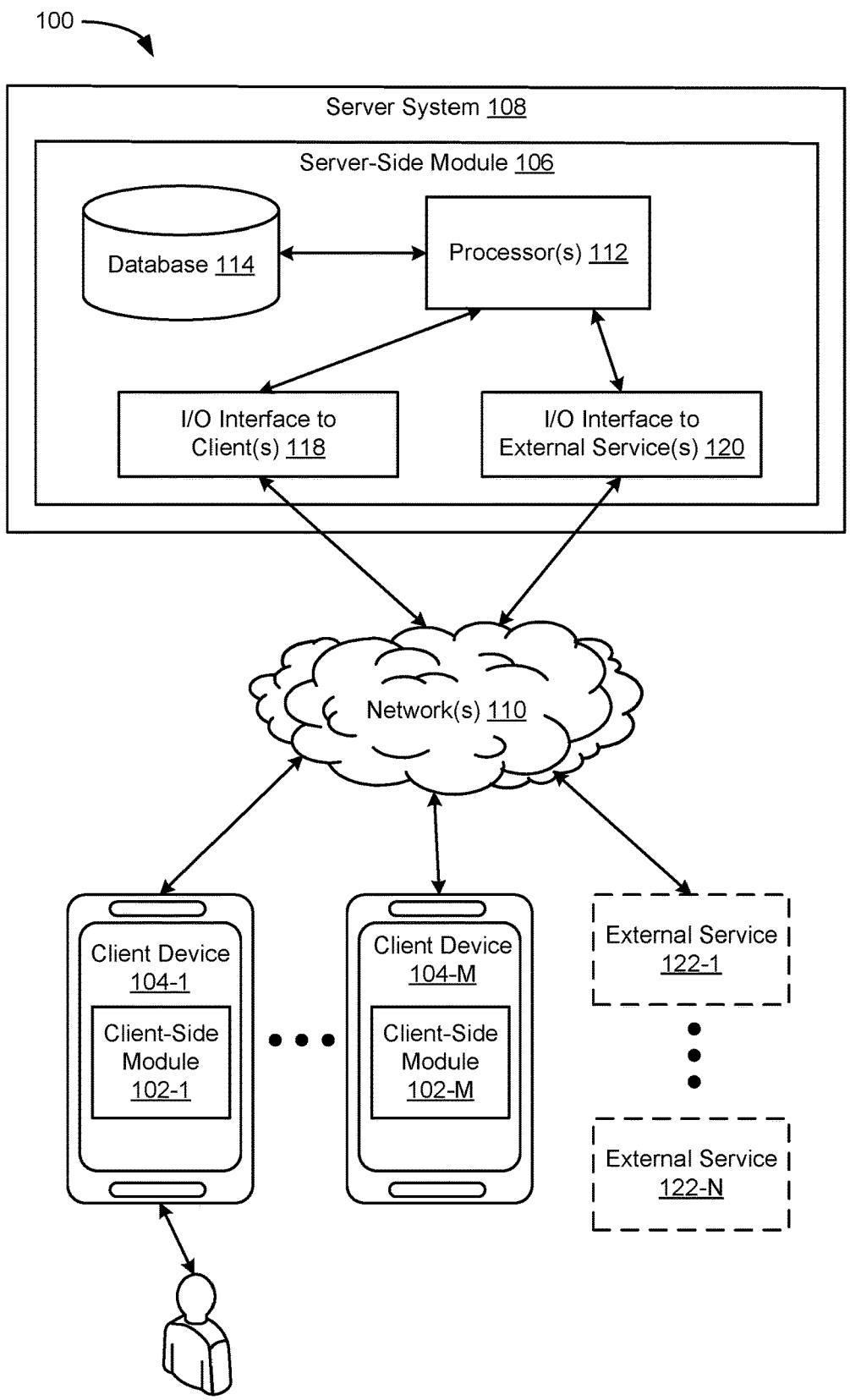
FIG. 1 is a block diagram of a server-client environment in accordance with some implementations.

FIG. 1 is a block diagram of a server-client environment 100 in accordance with some implementations. In accordance with some implementations, server-client environment 100 includes client-side processing 102-1 to 102-M (hereinafter "client-side module 102") executed on a client device 104-1 to 104-M, and server-side processing 106 (hereinafter "server-side module 106") executed on a server system 108. Client-side module 102 communicates with server-side module 106 through one or more networks 110. Client-side module 102 provides client-side functionalities for the social networking platform (e.g., instant messaging, and social networking services) and communications with server-side module 106. Server-side module 106 provides server-side functionalities for the social networking platform (e.g., instant messaging, and social networking services) for any number of client modules 102 each residing on a respective client device 104.

In some implementations, server-side module 106 includes one or more processors 112, one or more databases 114, an I/O interface to one or more clients 118, and an I/O interface to one or more external services 120. I/O interface to one or more clients 118 facilitates the client-facing input and output processing for server-side module 106. One or more processors 112 obtain instant messages during a chat session, process the instant messages, perform search as requested by the user, and provide requested search results to client-side modules 102. Database 114 stores various information, including but not limited to, user input data, and chat messages exchanged during a chat session. I/O interface to one or more external services 120 facilitates communications with one or more external services 122-1 to 122-N (e.g., merchant websites, credit card companies, and/or other payment processing services).

Examples of client device 104 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices.

Examples of one or more networks 110 include local area networks (LAN) and wide area networks (WAN) such as the Internet. One or more networks 110 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more standalone data processing apparatuses or a distributed network of computers. In some implementations, server system 108 also employs various virtual devices and/or services of third party service providers (e.g., third-party cloud service providers) to provide the underlying computing resources and/or infrastructure resources of server system 108.

Server-client environment 100 shown in FIG. 1 includes both a client-side portion (e.g., client-side module 102) and a server-side portion (e.g., server-side module 106). In some implementations, data processing is implemented as a stand-alone application installed on client device 104. In addition, the division of functionalities between the client and server portions of client environment data processing can vary in different implementations. For example, in some implementations, client-side module 102 is a thin-client that provides only user-facing input and output processing functions, and delegates all other data processing functionalities to a back-end server (e.g., server system 108).

Figure 2:
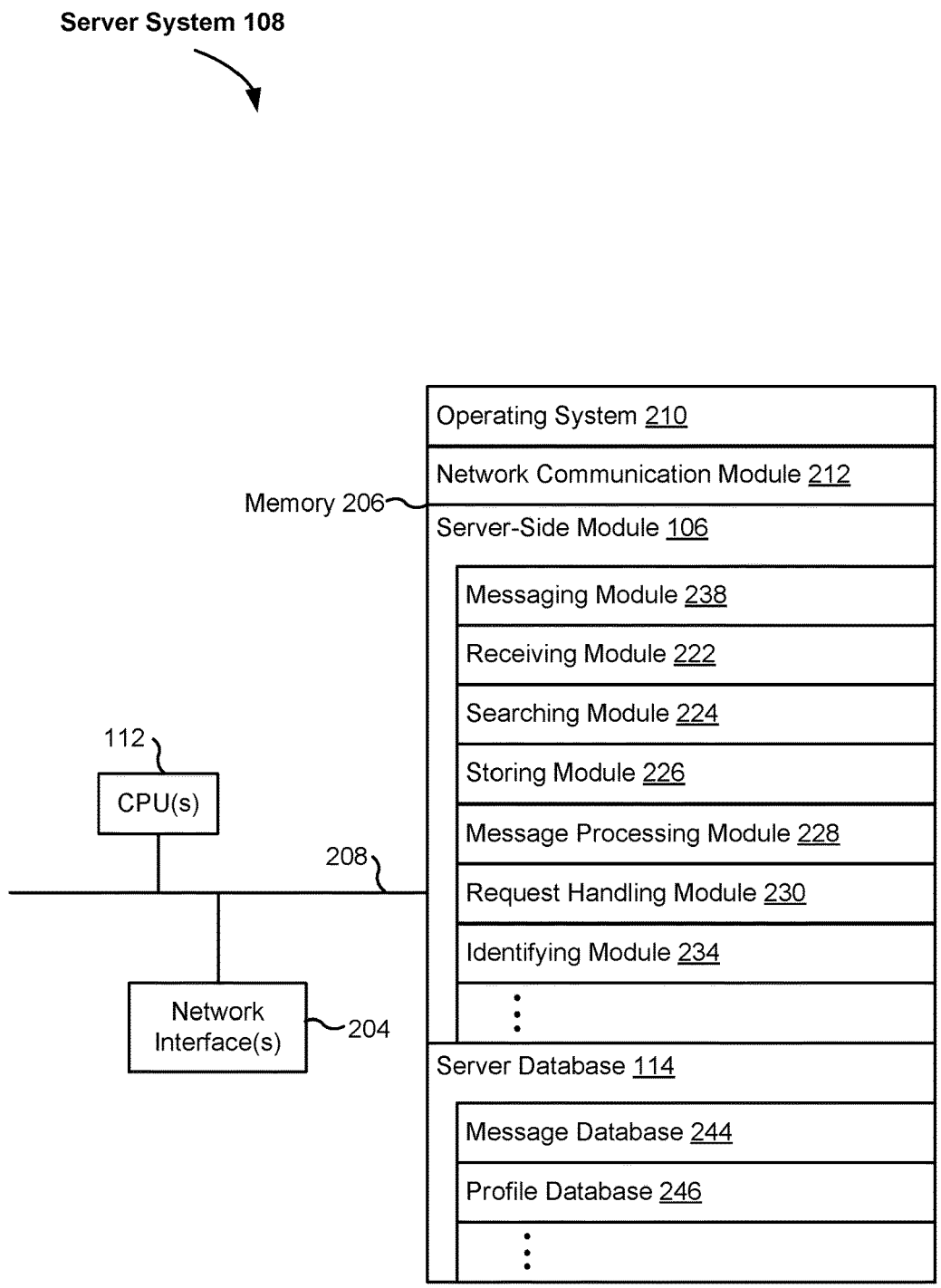
FIG. 2 is a block diagram of a server system in accordance with some implementations.

FIG. 2 is a block diagram illustrating a server system 108 in accordance with some implementations. Server system 108, typically, includes one or more processing units (CPUs) 112, one or more network interfaces 204 (e.g., including I/O interface to one or more clients 118 and I/O interface to one or more external services 120, FIG. 1), memory 206, and one or more communication buses 208 for interconnecting these components (sometimes called a chipset).

Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 112. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

- operating system 210 including procedures for handling various basic system services and for performing hardware dependent tasks;
- network communication module 212 for connecting server system 108 to other computing systems (e.g., client devices 104 and external service(s) 122) connected to one or more networks 110 via one or more network interfaces 204 (wired or wireless);

server-side module 106, which provides server-side data processing for the social networking platform (e.g., instant messaging, and social networking services), includes, but is not limited to:

messaging module 238 for managing and routing instant messages (e.g., audio inputs and/or text inputs) exchanged during a chat session among users of the social networking platform;

receiving module 222 for receiving an audio input from a user of client device 104, the audio input is used to perform an audio search on a social networking platform;

searching module 224 for searching, based on the received audio input, the database 114 for relevant matched audio input(s);

storing module 226 for storing audio inputs exchanged during a chat session in the database 114, e.g., the audio inputs exchanged within a chat conversation between two participants, or within a chat group among more than two participants during a chat session;

message processing module 228 for processing the audio inputs received and stored at server system 108, e.g., generating audio confusion networks from audio inputs, and/or converting audio inputs into text messages;

request handling module 230 for handling and responding to requests from users of the social networking platform for various search results; and identifying module 234 for identifying information items relevant to search results (e.g., matched audio input) to the respective user in response to user's requests; and one or more server database(s) 114 storing data for the social networking platform, including but not limited to:

message database 244 storing chat record entries in accordance with the instant messages (e.g., audio inputs and/or text inputs) for respective users exchanged during a chat session; and profile database 246 storing user profiles for users of the social networking platform, where a respective user profile for a user includes a user/account name or handle, login credentials to the social networking platform, payment data (e.g., linked credit card information, app credit or gift card balance, billing address, shipping address, etc.), custom parameters (e.g., age, location, hobbies, etc.) for the user, social networking contacts, groups of contacts to which the user belongs, and identified trends and/or likes/dislikes of the user.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 3:
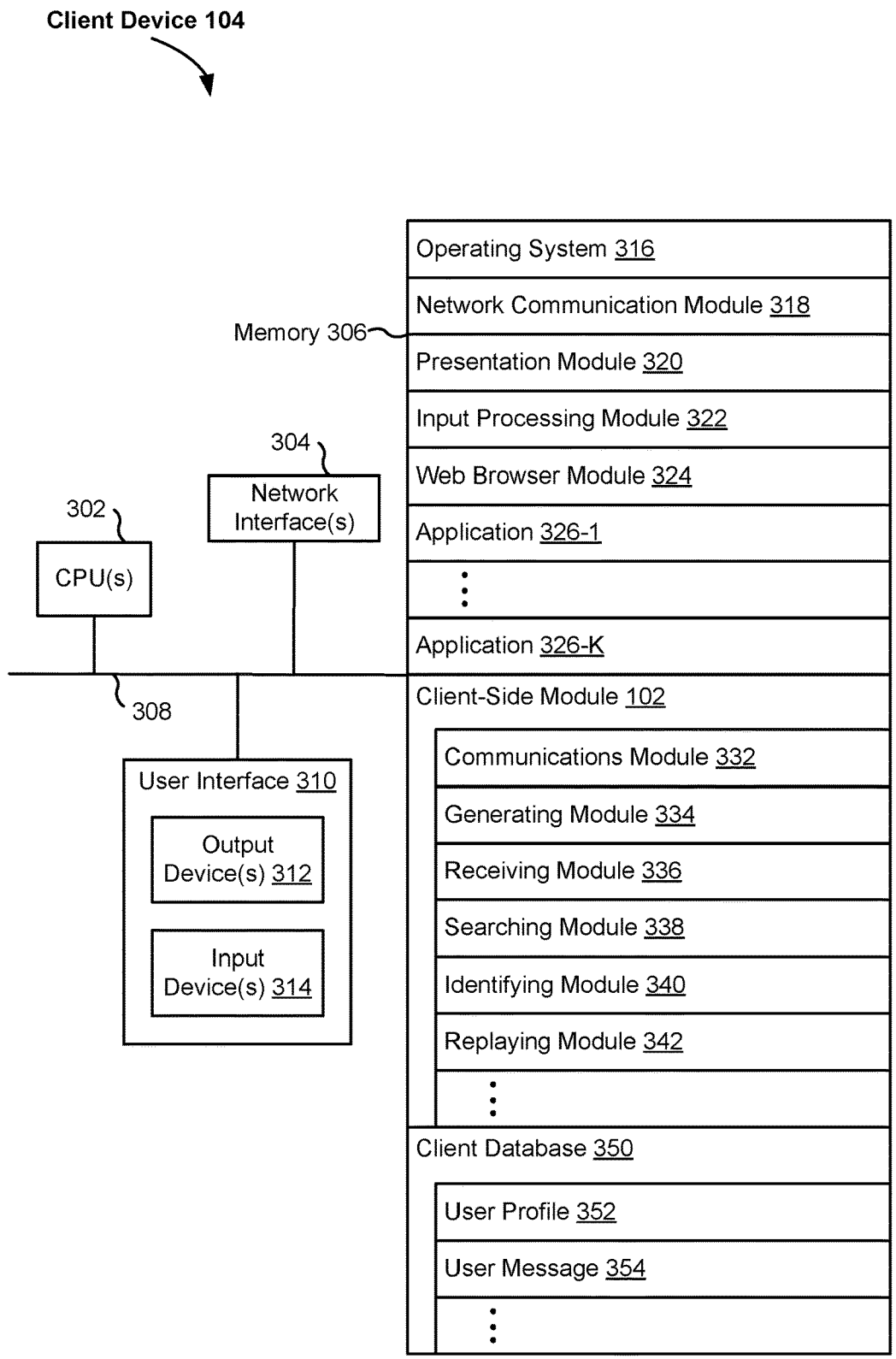
FIG. 3 is a block diagram of a client device in accordance with some implementations.

FIG. 3 is a block diagram illustrating a representative client device 104 associated with a user in accordance with some implementations. Client device 104, typically, includes one or more processing units (CPUs) 302, one or more network interfaces 304, memory 306, and one or more communication buses 308 for interconnecting these components (sometimes called a chipset). Client device 104 also includes a user interface 310. User interface 310 includes one or more output devices 312 that enable presentation of media content, including one or more speakers and/or one or more visual displays. User interface 310 also includes one or more input devices 314, including user interface components that facilitate user input such as a keyboard, a mouse, a voice-command input unit or microphone, a touch screen display, a touch-sensitive input pad, a camera, a gesture capturing camera, or other input buttons or controls. Furthermore, some client devices 104 use a microphone and voice recognition or a camera and gesture recognition to supplement or replace the keyboard.

Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

operating system 316 including procedures for handling various basic system services and for performing hardware dependent tasks;

network communication module 318 for connecting client device 104 to other computing devices (e.g., server system 108 and external service(s) 122) connected to one or more networks 110 via one or more network interfaces 304 (wired or wireless);

presentation module 320 for enabling presentation of information (e.g., a user interface for a social networking platform, widget, webpage, game, and/or application, audio and/or video content, text, etc.) at client device 104 via one or more output devices 312 (e.g., speakers, displays, etc.) associated with user interface 310;

input processing module 322 for detecting one or more user inputs (e.g., audio inputs) or interactions from one of the one or more input devices 314 (e.g., a speaker) and interpreting the detected input or interaction;

web browser module 324 for navigating, requesting (e.g., via HTTP), and displaying websites and web pages thereof;

one or more applications 326-1 to 326-K for execution by client device 104 (e.g., social networking platforms, games, application marketplaces, payment platforms, and/or other applications); and client-side module 102, which provides client-side data processing and functionalities for the social networking platform, including but not limited to:

communication module 332 for sending audio inputs to and receiving audio inputs from the social networking platform (e.g., instant messaging, group chat, message board, message/news feed, and the like);

generating module 334 for generating audio confusion networks from audio inputs, and/or converting audio inputs into text messages;

receiving module 336 for receiving an audio input from the user of client device 104, the audio input is used to perform an audio search on a social networking platform; and searching module 338 for searching, based on the received audio input, the database 350 for relevant matched audio input(s);

identifying module 340 for identifying one or more audio inputs that match the received audio input; and replaying module 342 for replaying the identified audio input(s); and client database 350 for storing data associated with the social networking platform, including, but is not limited to:

user profile 352 storing a user profile associated with the user of client device 104 including user a/account name or handle, login credentials to the social networking platform, payment data (e.g., linked credit card information, app credit or gift card balance, billing address, shipping address, etc.), custom parameters (e.g., age, location, hobbies, etc.) for the user, social networking contacts, groups of contacts to which the user belongs, and identified trends and/or likes/dislikes of the user; and user message 354 storing instant messages (e.g., audio inputs and/or text inputs) exchanged during a chat session for the user of client device 104.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

In some implementations, at least some of the functions of server system 108 are performed by client device 104, and the corresponding sub-modules of these functions may be located within client device 104 rather than server system 108. In some implementations, at least some of the functions of client device 104 are performed by server system 108, and the corresponding sub-modules of these functions may be located within server system 108 rather than client device 104. Client device 104 and server system 108 shown in FIGS. 2-3, respectively, are merely illustrative, and different configurations of the modules for implementing the functions described herein are possible in various implementations.

Figure 4A:
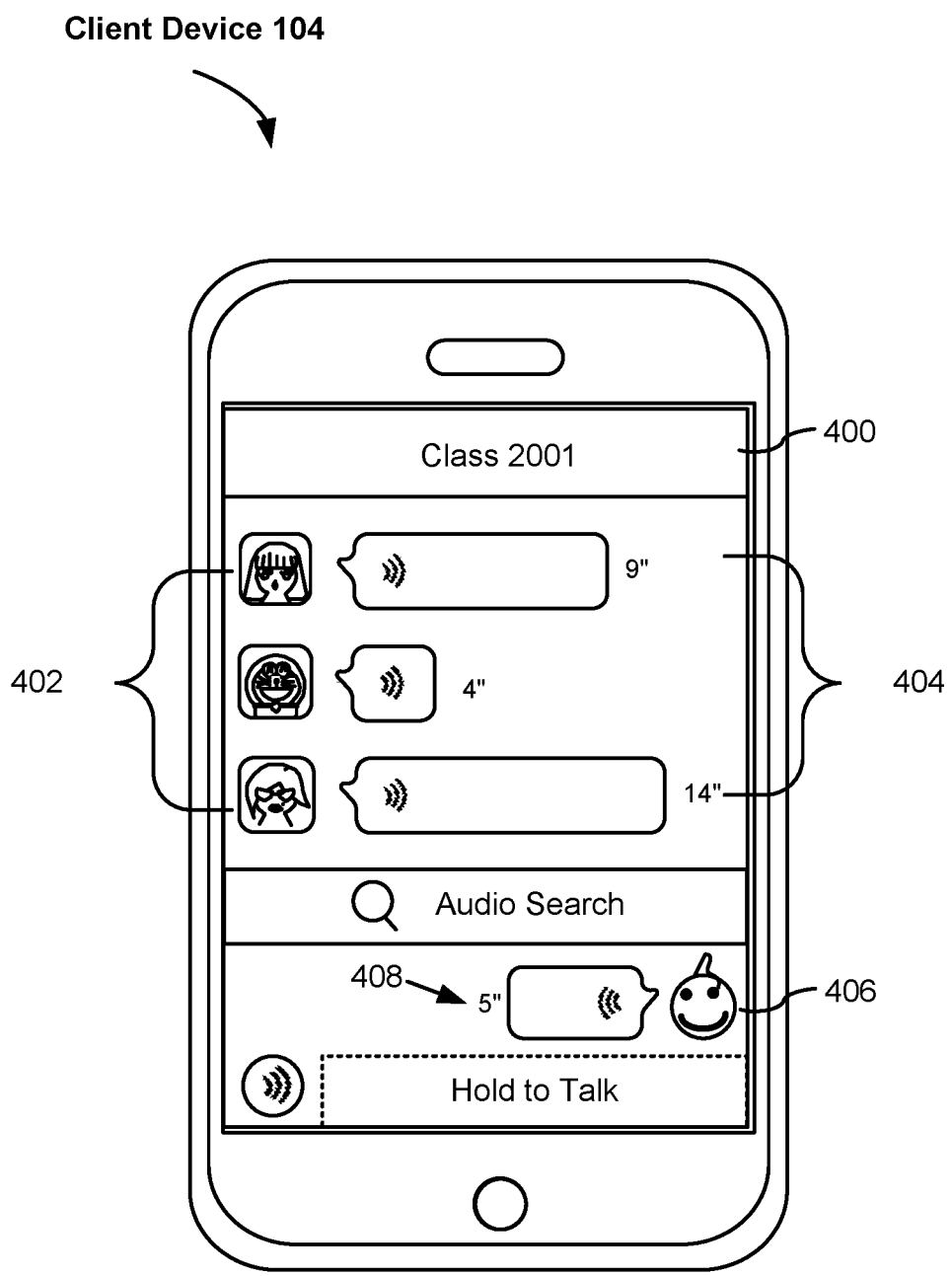
FIGS. 4A-4D are exemplary implementations of user interfaces for audio search in accordance with some implementations.

FIG. 4A is an exemplary implementation of a user interface 400 for performing an audio search while running a social networking application (e.g., WeChat™ app). As shown in FIG. 4A, a chat group (e.g., "Class 2001") includes multiple participants 402 exchanging multiple audio inputs 404 during a chat session. When user 406 of client device 104, who is also a participant of the chat session, wants to search for a specific audio input transmitted during the chat session, the user can record an audio input 408 to initiate the audio search within the multiple audio inputs 404. Although the user interface for an audio search is illustrated in FIG. 4A using a group chat interface as an example, it is not intended to be exhaustive or limiting. For example, the audio search according to some implementations of the present application can also be performed in a conversation between two participants.

For example, the multiple audio inputs 404 are exchanged among the participants of the chat group "Class 2001" during a chat session in order to decide details of a dinner event to be held. One or more audio inputs of audio inputs 404 may include a time and a place of the dinner event as finally decided. User 406 may want to initiate an audio search to identify the specific audio input(s) which include the time and the place of the dinner event. For example, user 406 may speak to the microphone of client device 104 while pressing the "Hold to Talk" button. In some implementations, one or more keywords are included in audio input 406. In some examples, the one or more keywords include "dinner", "time", and/or "place" as relevant keywords to be used for the audio search process. In some other examples, user 406 may remember partial information of the dinner event, such as name of the restaurant (e.g., Xiaofeiyang) and/or date (e.g., today) of the dinner event, but would like to find the original audio input to review the full information and/or to verify the information. In such implementations, user 406 may use keywords that are similar or identical to some words included in the original audio input, such as "dinner", "Xiaofeiyang", and "today".

Figure 4B:
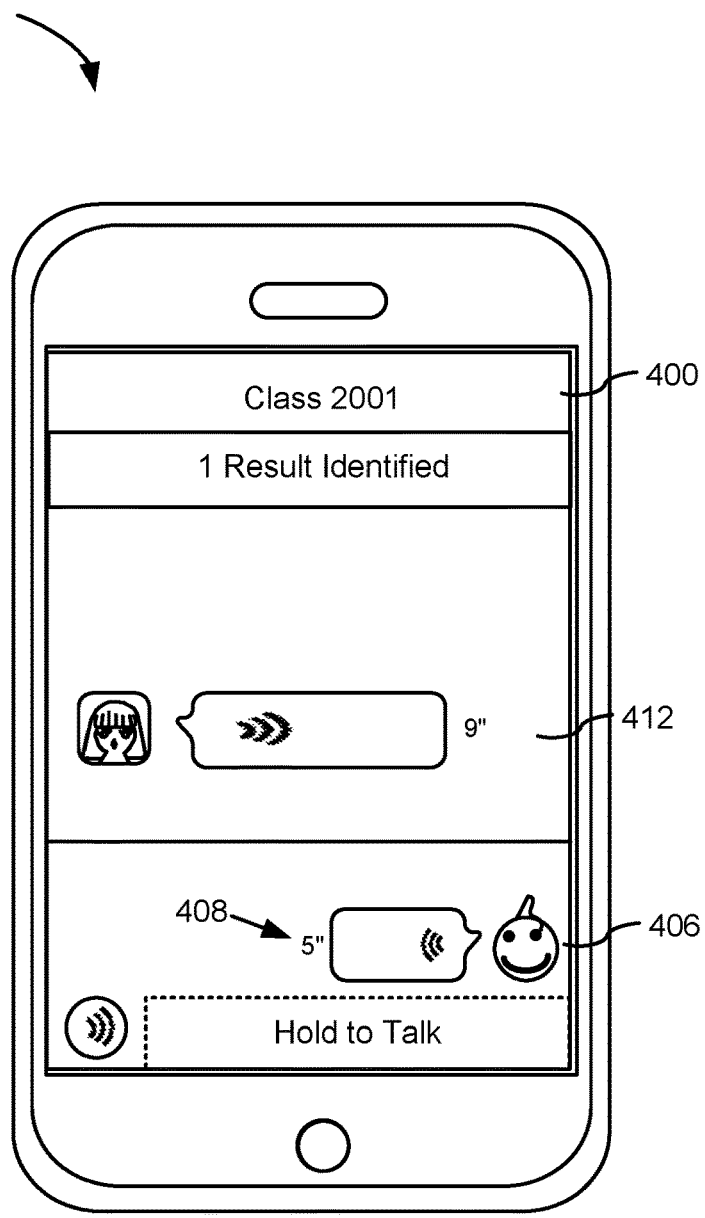

FIG. 4B is an exemplary implementation of user interface 400 after the computer system identifies an audio input 412 based on audio input 408 from user 406. In some implementations, client device 104 automatically replays the identified audio input 412 to the user without any further user instruction. In some implementations, the identified audio input 412 is displayed along with its context (i.e., other text/audio messages before or after the identified audio input 412) in the user interface 400. For example, the identified audio input 412 may be displayed in a matter visually distinguishable from the other text/audio messages so that the user 406 knows which audio message(s) match the audio input 408.

Figure 4C:
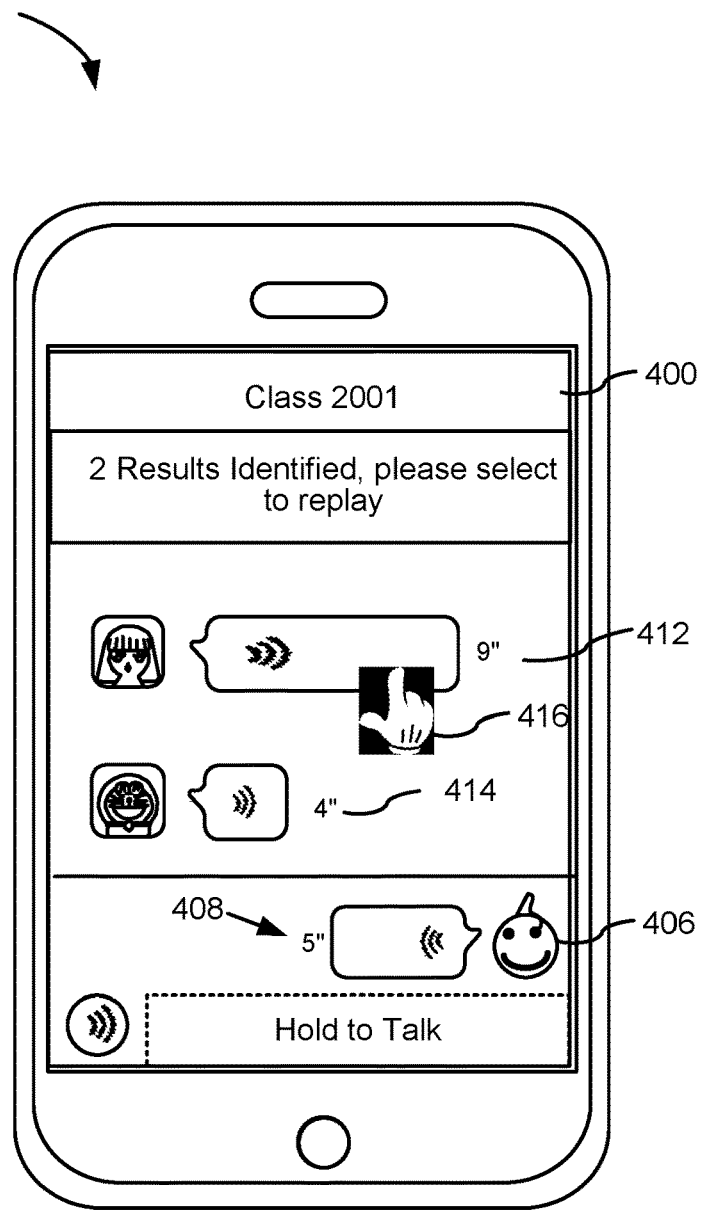

FIG. 4C is an exemplary implementation of user interface 400 when the computer system identifies more than one audio input (e.g. audio input 412 and audio input 414) based on audio input 408 from user 406. In such implementations, the multiple audio inputs are displayed on user interface 400 for user 406 to select one audio input for replay. As shown in FIG. 4C, for example, user 406 selects (416) audio input 412, and client device 104 replays the selected audio input for the user. In some implementations, user 406 may tap (416) a blurb corresponding to audio input 412 to select the audio input for replay.

Figure 4D:
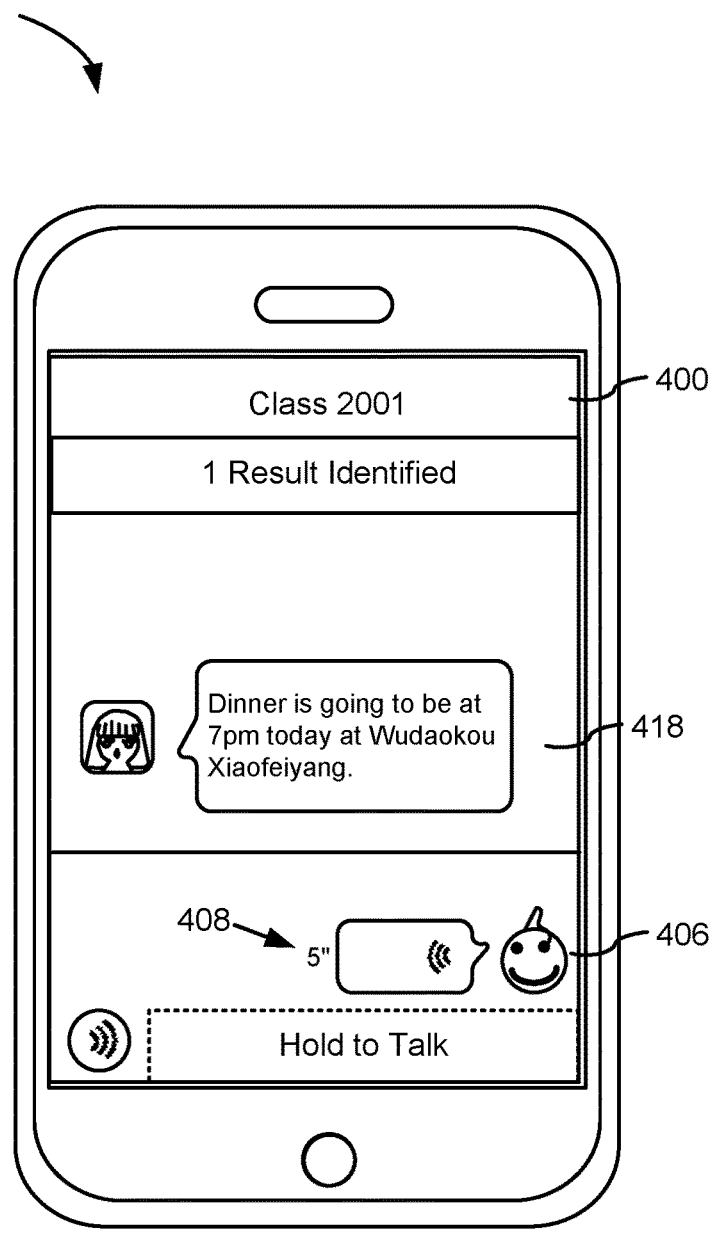

FIG. 4D is an exemplary implementation of user interface 400 for displaying an identified audio input in text form. As shown in FIG. 4D, the computer system identifies an audio input based on audio input 406 and the computer system converts the identified audio input into a text message. The text message is then displayed to be viewed by the user. As mentioned earlier, user 406 may look for the audio input including the details of the dinner event. The computer system identifies an audio input 412 of FIG. 4B, which includes dinner event information, and converts the audio input 412 into a text message 418 for display as shown in FIG. 4D. This feature can be useful when a user can quickly glance at the text message, and select to play the audio message only if there is anything unclear from the text message.

Figure 5A:
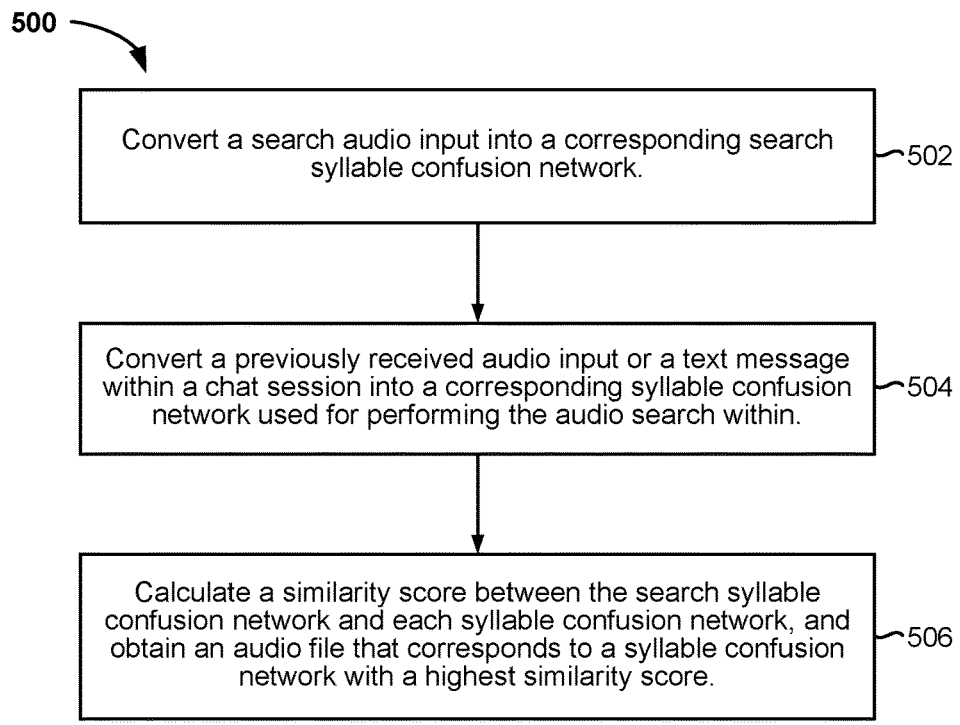
FIG. 5A is a flowchart diagram of a method for searching a matched audio confusion network in accordance with some implementations.

FIG. 5A is a flowchart diagram of a method 500 for searching a matched audio confusion network in accordance with some implementations. Method 500 is performed by a computer system, such as client device 104, FIGS. 1 and 3, or server system 108, FIGS. 1-2. In method 500, the computer system converts (502) a search audio input (e.g., audio input 408, FIGS. 4A-4D) into a corresponding search syllable confusion network. The computer system converts (504) a previously received audio input (e.g., audio inputs 404, FIG. 4A) or a text message during a chat session into a corresponding syllable confusion network used for performing the audio search within. The computer system calculates (506) a similarity score between the search syllable confusion network and each syllable confusion network corresponding to the previously received audio inputs and/or text messages. The computer system obtains (506) an audio input (e.g., audio input 412) that corresponds to a syllable confusion network with a highest similarity score. In such implementations, method 500 avoids converting an audio input into a word or a syllable/phoneme form. Therefore, method 500 can prevent the adverse impact on audio search caused by an error in the conversion process.

Figure 5B:
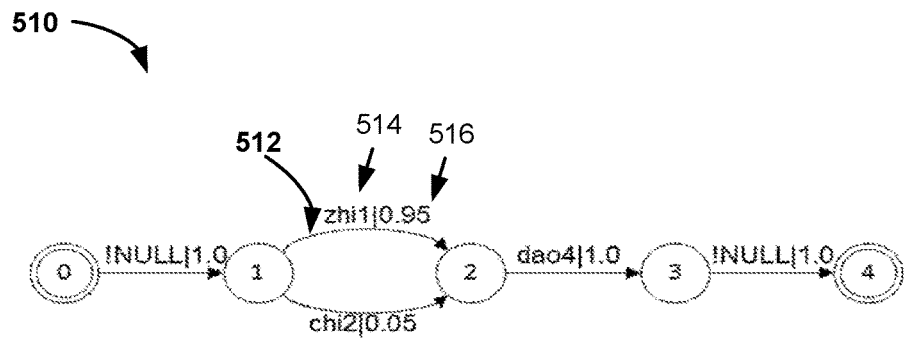
FIG. 5B is a schematic diagram of a syllable confusion network in accordance with some implementations.

FIG. 5B illustrates an example of a syllable confusion network 510 in accordance with some implementations. A syllable confusion network is a special weighted directed graph structure including a plurality of nodes. Any path from an initial node (e.g., node 0) to an end node (e.g., node 4) in a syllable confusion network must pass through all other nodes (e.g., nodes 1, 2, and 3). The nodes of the syllable confusion network are sorted to form a sequence, an edge 512 only exists between two neighboring nodes, and the edge has a syllable label 514 and a weight 516. More than one edge may exist between two neighboring nodes, and a sum of the weights of all the edges between two neighboring nodes is 1.

A process of converting an audio input into a syllable confusion network may include two steps: first, decoding the audio input using a syllable decoder to generate an intermediate result Lattice; and then, generating a syllable confusion network using a Lattice conversion tool. These two steps may be performed using any suitable existing technology.

A process of converting a text message to be searched for into a syllable confusion network is generally divided into two parts: first, converting the text message into a syllable sequence, and then generating a syllable confusion network according to the syllable sequence.

Figure 5C:
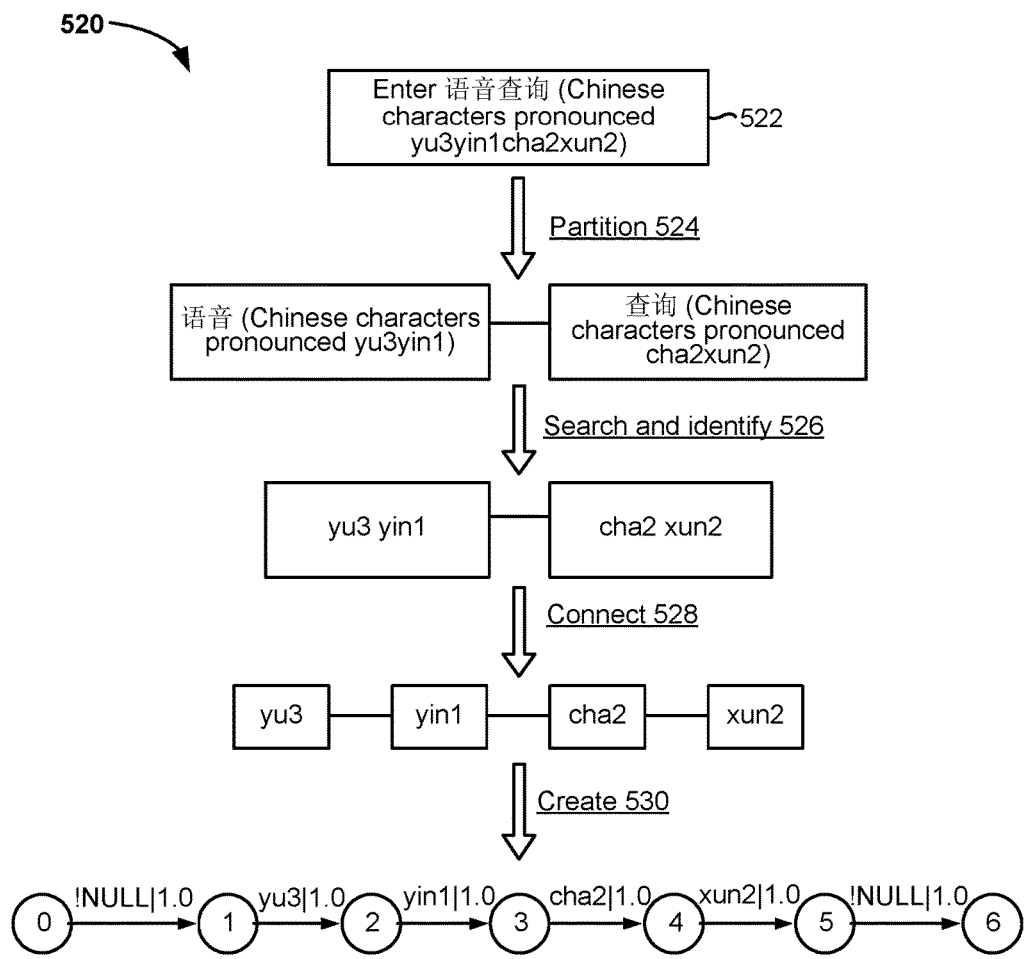
FIG. 5C is a flowchart diagram of searching a matched syllable confusion network in accordance with some implementations.

FIG. 5C is a flowchart diagram 520 illustrating searching a matched syllable confusion network in accordance with some implementations. In method 520, the computer system enters (522) a text to be searched for, for example, "语音查询" (Chinese characters pronounced yu3yin1cha2xun2). The computer system partitions (524) the text to be searched for into n words using a forward maximum matching algorithm, and mark the words as $W_1, W_2, \ldots, W_n$. In this example, text 522 is partitioned into 2 words, namely, "语音" (Chinese characters pronounced yu3yin1) and "查询" (Chinese characters pronounced cha2xun2). For each word in $W_1, W_2, \ldots, W_n$, the computer system searches and identifies (526) a corresponding syllable in a word list with phonetic notion.

The computer system connects (528) found syllables in series to create a syllable sequence, and mark the syllable sequence as $y_1, y_2, \ldots, y_m$. In the syllable sequence, m is the number of syllables, and $y_i$ (i=1, 2, ..., m) is a syllable. The generated syllable sequence is shown in FIG. 5C.

The computer system creates (530) an initial node $V_0$ and an end node $V_{m+2}$; and creates (530) (m+1) intermediate nodes, including $V_1, V_2, \ldots, V_{m+1}$. In some implementations, one edge between $V_0$ and $V_1$ is created, a syllable label of the edge is set to an empty label (!NULL), and a weight of the edge is set to 1. One edge between $V_{m+1}$ and $V_{m+2}$ (e.g., between node 5 and node 6) is created, a syllable label of the edge is set to !NULL, and a weight of the edge is set to 1. One edge is created in sequence for two neighboring intermediate nodes $V_i$ and $V_{i+1}$ (i=1, 2, ..., m), (e.g., between node 1 and node 2, between node 2 and node 3, between node 3 and node 4, between node 4 and node 5), a syllable label of each edge is separately set to $y_1, y_2, \ldots, y_m$, and a weight of each edge is set to 1.

In some implementations with respect to step 502 of method 500 in FIG. 5A, an index of all syllable confusion networks may further be created. With respect to step 506, the search syllable confusion network including all syllables in the previous syllable confusion networks may be determined by searching the index, and calculating a similarity score between the search syllable confusion network and each previous syllable confusion network.

In some implementations, the index of the search syllable confusion network includes a forward index and an inverted index. The forward index stores a correspondence between search syllable confusion network corresponding to search audio input, and syllable confusion network identifiers. The inverted index includes syllable confusion network identifiers of search syllable confusion network to which syllables of the search syllable confusion network belongs, and weights of edges corresponding to the syllables. An index unit in the inverted index is a syllable, and an index entry records information such as an identifier of a search syllable confusion network corresponding to where a syllable is located and a weight of an edge corresponding to the syllable.

Figure 5D:
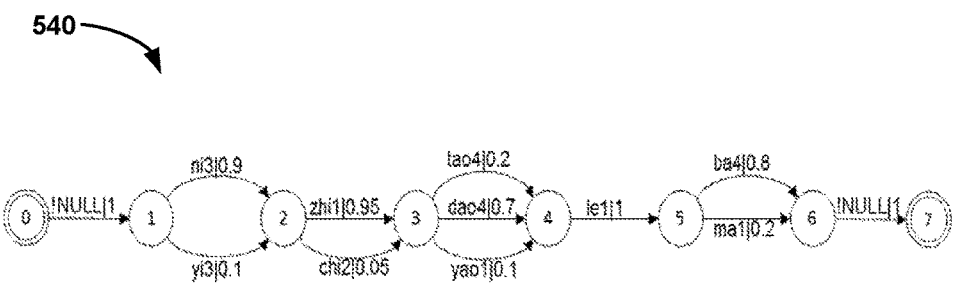
FIG. 5D is a schematic diagram of a syllable confusion network in accordance with some implementations.
Figure 5E:
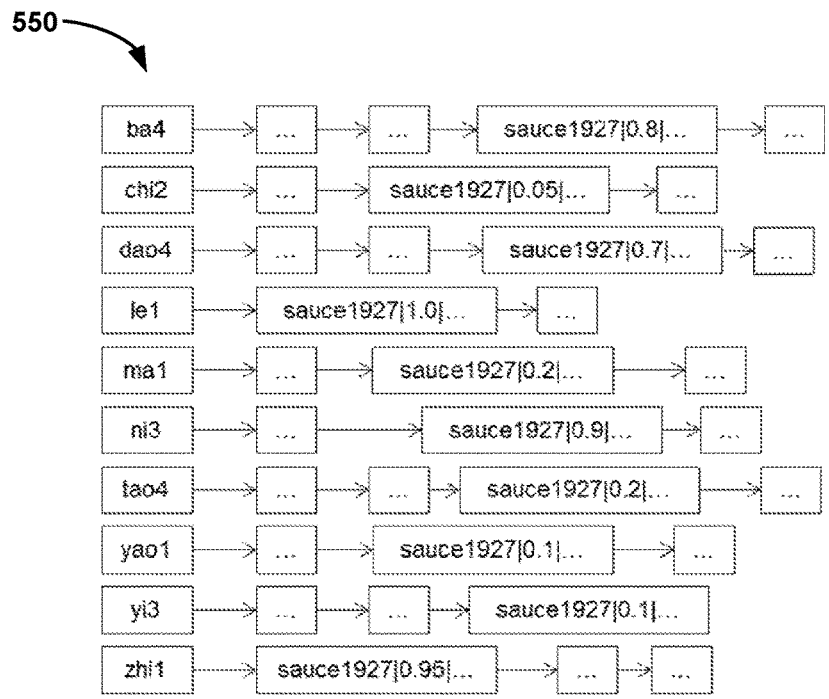
FIG. 5E is a schematic diagram of an inverted index network in accordance with some implementations.

FIG. 5D is a schematic diagram 540 of a syllable confusion network in accordance with some implementations. The identifier of the syllable confusion network is sauce1927. FIG. 5E is a schematic diagram of an inverted index network 550 in accordance with some implementations. In FIG. 5E, there is an index entry list for each syllable, and each block connected behind the syllable is an index entry of the syllable. One or more steps of creating an index is discussed below with reference to FIGS. 5D-5E.

Step 1: Generate syllable confusion networks, where each syllable confusion network corresponds to an identifier sid.

Step 2: Save each syllable confusion network and the identifier sid corresponding to the syllable confusion network into a forward index.

Step 3: For each syllable of the search syllable confusion network in all the syllable confusion networks corresponding to the previously received audio inputs, separately establish a corresponding index entry list, where the index entry list includes the syllable.

Step 4: For each edge in all the syllable confusion networks, sequentially perform the following steps until all edges are processed: (1) assuming that an edge has a syllable label of lb1 and a weight of w, look up in an inverted index input for an index entry list that corresponds to lbl; (2) create an index entry, and record an identifier sid of a syllable confusion network where the edge is located, the weight w of the edge, and other information; and (3) insert the created index entry into the index entry list corresponding to lbl.

In some implementations, searching using a syllable confusion network includes: assuming that a previously received audio input, or the corresponding syllable confusion network is S, and a search syllable confusion network corresponding to a search audio input is D. In accordance with a determination that at least one path from an initial node to an end node in S can be found in D, the search is regarded as successful.

In some implementations, a syllable confusion network is converted into a state transition search table. For example, when the text corresponding the syllable confusion network is "腾讯," (Chinese characters pronounced teng2xun4), the state transition search table corresponding to the syllable confusion network of "teng2xun4" is shown in Table 1.

TABLE 1

|   | !NULL | teng2 | xun4 |
|---|-------|-------|------|
| 0 | 1:1.0 |       |      |
| 1 |       | 2:1.0 |      |
| 2 |       |       | 3:1.0 |
| 3 | 4:1.0 |       |      |
| 4 |       |       |      |

As shown in Table 1, the row number represents a status, and the column number represents a syllable label. If the row is X, the column is Y, and the corresponding cell is not empty, it indicates that an edge whose start point is a node in status X and whose syllable label is Y exists. In addition, content of the cell includes an end point and a weight of the edge. For example, as shown in Table 1, in a corresponding syllable confusion network, there is an edge whose start point is a node in status 0 and whose syllable label is !NULL; an end point of the edge is a node in status 1 and a weight of the edge is 1.0.

In some implementations, a method of calculating a similarity score between a syllable confusion network and a search syllable confusion network using the state transition search table (e.g., Table 1) includes the following steps:

Step 1: Search an index, and determine a syllable confusion network corresponding to a previously received audio input (e.g., sauce1927) that includes all syllables contained in the search syllable confusion network. In some implementations, the index of search syllable confusion network is searched according to the syllable sequence $y_1, y_2, \ldots, y_m$ in the syllable confusion network, to obtain sets of target syllable confusion networks corresponding to the syllables, and the sets are marked as $Set_1, Set_2, \ldots, Set_m$. An intersection of $Set_1, Set_2, \ldots, Set_m$ is calculated, to obtain a set corresponding to the syllable confusion network to be searched for that includes syllables $y_1, y_2, \ldots, y_m$: $Set=Set_1 \cap Set_2 \ldots \cap Set_m$.

Step 2: Generate a corresponding state transition search table T for the syllable confusion network S.

Step 3: Calculate a similarity score between S and each target syllable confusion network $D_i$ in the set. In some implementations, the method of calculating the similarity score includes: (1) creating a token for each node of $D_i$, setting the status of the token to an initial status of T, setting the observation of the token to !NULL, setting the weight of the token to 1, and setting the score of the token to 0; (2) performing the following step A for each token, to obtain a list of finally surviving tokens, calculating the sum of scores of all tokens in the list of finally surviving tokens, and using the result of the calculation as the similarity between the syllable confusion network to be searched for and the target syllable confusion network.

A: Determine whether the observation of the current token is !NULL, and if yes, perform the following step B; otherwise, perform the following step C.

B: In the state transition search table, search for a corresponding cell in the row of Status and the column of !NULL. Assuming that the status in the cell is Status', if Status' is an end status of the state transition search table, add the current token to the list of finally surviving tokens, and end the current step; otherwise, delete the current token, search for non-empty cells $C_1 \ldots C_k$ in the row of Status', create k new tokens at the current position, where the status of each new token is Status', the observation of each new token is the syllable label on the column that corresponds to the cell, the weight of each new token is the weight in the cell, and the score of each new token is the score of the current token, and continue to perform step A for the new tokens.

C: Assuming that the observation of the token is obsr, traverse all edges in the target syllable confusion network whose start node is the node where the token is located, and if none of the syllable labels of the edges is obsr, delete the token; and if there is an edge whose syllable label is obsr, perform the following step:

search, in the state transition search table, for a corresponding cell in the row of Status and in the column of obsr;

assuming that the status of the corresponding cell is Status', if Status' is an end status of the state transition search table, add the current token to the list of finally surviving tokens, and end the current step;

otherwise, delete the current token;

search, in the state transition search table, for non-empty cells C1 ... Ck in the row of Status';

create k new tokens at the end node of the edge, where the status of each token is Status', the observation of each token is the syllable label on the column that corresponds to the cell, the weight of each token is the weight in the cell, and the score of each token is updated to the sum of the original score and the product of the weight of the current token and the weight of the edge; and continue to perform step A for the new tokens.

Step 4: Sort the target search syllable confusion networks in the set according to descending order of the similarity scores, where a greater similarity score indicates that the target search syllable confusion network and the syllable confusion network to be searched for are more similar, and the target audio input corresponding to the target search syllable confusion network is the target audio input that needs to be searched for in the present application.

Figure 5F:
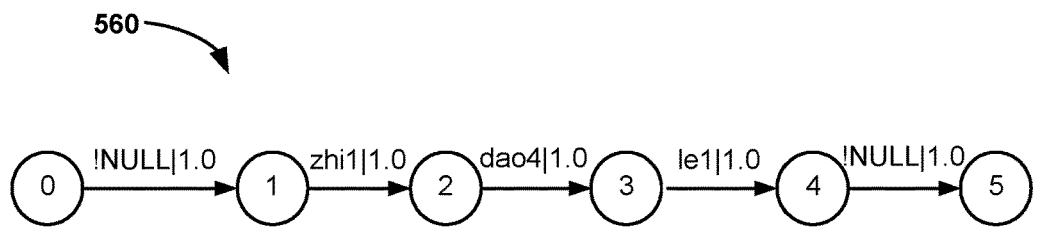
FIG. 5F is a schematic diagram of a syllable confusion network in accordance with some implementations.

In an exemplary embodiment of a method for calculating the similarity score, the search audio input is "知道了" (Chinese characters pronounced "zhi1dao4le1"), and FIG. 5F is a schematic diagram 560 of a syllable confusion network S to be searched for. The S is converted into a state transition search table T, as shown in Table 2.

TABLE 2

|   | !NULL | zhi1  | dao4  | le1   |
|---|-------|-------|-------|-------|
| 0 | 1:1.0 |       |       |       |
| 1 |       | 2:1.0 |       |       |
| 2 |       |       | 3:1.0 |       |
| 3 |       |       |       | 4:1.0 |
| 4 | 5:1.0 |       |       |       |
| 5 |       |       |       |       |

As shown in FIG. 5D, a schematic diagram 540 of a syllable confusion network is illustrated. When the similarity score is calculated, a token for each node of D is created.

For the node in status 0: a token A is created, the status of the token A is set to Status=0, the observation is set to !UNLL, the weight is set to 1, and the score is set to Score=0. As the observation of the token A is !UNLL, a cell corresponding to (0, !UNLL) is looked up for in Table 2; the status Status'=1 in the cell is not the end status of Table 2, so the token A is deleted; a non-empty cell is searched for in the row of 1 (that is, the value of Status') in Table 2; the syllable label in the column that corresponds to the cell is zhi1 and the weight in the cell is 1, so a new token B is created at the current position (that is, the node in status 0), the status of the token B is set to Status=1 (that is, the value of Status'), the observation is set to zhi1, the weight is set to 1 (that is, the weight in the cell), and the score is set to Score=0 (that is, the score of the token A). As the observation of the token B is not !UNLL, in D, all edges whose start points are the node where the token B is located (that is, the node in status 0) are traversed, and a traversing result is that none of the syllable labels of the edges is zhi1, so the token B is deleted.

For the node in status 1: a token C is created, the status of the token C is set to Status=0, the observation is set to !UNLL, the weight is set to 1, and the score is set to Score=0. As the observation of the token C is !UNLL, a cell corresponding to (0, !UNLL) is looked up for in Table 2; the status Status'=1 in the cell is not the end status of Table 2, so the token C is deleted; a non-empty cell in the row of 1 (that is, the value of Status') is searched for in Table 2; the syllable label on the column that corresponds to the cell is zhi1 and the weight in the cell is 1, so a new token D is created at the current position (that is, the node in status 1); the status of the token D is set to Status=1 (that is, the value of Status'), the observation is set to zhi1, the weight is set to 1 (that is, the weight in the cell), and the score is set to Score=0 (that is, the score of the token C). As the observation of the token D is not !UNLL, in D, all edges whose start nodes are the node where the token D is located (that is, the node in status 1) are traversed, and a traversing result is that none of the syllable labels of the edges is zhi1, so the token D is deleted.

For the node in status 2: a token E is created, the status of the token E is set to Status=0, the observation is set to !UNLL, the weight is set to 1, and the score is set to Score=0. As the observation of the token E is !UNLL, a cell corresponding to (0, !UNLL) is looked up for in Table 2; the status Status'=1 in the cell is not the end status of Table 2, so the token E is deleted; a non-empty cell in the row of 1 (that is, the value of Status') is searched for in Table 2; the syllable label on the column that corresponds to the cell is zhi1 and the weight in the cell is 1, so a new token F is created at the current position (that is, the node in status 2); the status of the token F is set to Status=1 (that is, the value of Status'), the observation is set to zhi1, the weight is set to 1 (that is, the weight in the cell), and the score is set to Score=0 (that is, the score of the token E).

As the observation of the token F is not !UNLL, in D, all edges whose start nodes are the node where the token E is located (that is, the node in status 2) are traversed, and a traversing result is that there is one edge whose syllable label is zhi1; a cell corresponding to (1, zhi1) is searched for in Table 2; the status corresponding to the cell is Status'=2, which is not the end status of the Table 2, so the token F is deleted; a non-empty cell in the row of 2 (that is, the value of Status') is searched for in Table 2; the syllable label on the column that corresponds to the cell is dao4 and the weight in the cell is 1, so a token G is created at the end node of the edge (that is, the node in status 3); the status of the token G is set to Status=2 (that is, the value of Status'), the observation is set to dao4, the weight is set to 1 (that is, the weight in the cell), and the score is set to Score=0+1*0.95=0.95.

As the observation of the token G is not !UNLL, in D, all edges whose start nodes are the node where the token G is located (that is, the node in status 3) are traversed, and a traversing result is that there is one edge whose syllable label is dao4; a cell corresponding to (2, dao4) is searched for in Table 2; the status corresponding to the cell is Status'=3, which is not the end status of Table 2, so the token G is deleted; a non-empty cell in the row of 3 (that is, the value of Status') is searched for in Table 2; the syllable label on the column that corresponds to the cell is le1 and the weight in the cell is 1, so a token H is created at the end node of the edge (that is, the node in status 4); the status of the token H is set to Status=3 (that is, the value of Status), the observation is set to le1, the weight is set to 1 (that is, the weight in the cell), and the score is set to Score=0.95+1*0.7=1.65.

As the observation of the token H is not !UNLL, in D, all edges whose start nodes are the node where the token H is located (that is, the node in status 4) are traversed, and a traversing result is that there is one edge whose syllable label is le1; a cell corresponding to (3, le1) is searched for in Table 2; the status corresponding to the cell is Status'=4, which is not the end status of Table 2, so the token H is deleted; a non-empty cell in the row of is 4 (that is, the value of Status') is searched for in Table 2; the syllable label on the column that corresponds to the cell is !NULL and the weight in the cell is 1, so a token I is created at the end node of the edge (that is, the node in status 5); the status of the token I is set to Status=4 (that is, the value of Status), the observation is set to !NULL, the weight is set to 1 (that is, the weight in the cell), and the score is set to Score=1.65+1*1=2.65.

As the observation of the token I is !UNLL, a cell corresponding to (4, !UNLL) is looked up for in Table 2; the status Status'=5 in the cell is the end status of Table 2, so the token I is added to the list of finally surviving tokens.

Afterwards, a token is set for each node in status 3, 4, 5, 6, 7, which is performed in the same manner as mentioned above. In the end, if the list of finally surviving tokens includes one token I, and the score of the token I is Score=2.65, the score can be used as the similarity score between the syllable confusion network S to be searched for and the target syllable confusion network D. If the list of finally surviving tokens includes multiple tokens, the sum of the scores of all the tokens is calculated, and the result of the calculation can be used as the similarity between the syllable confusion network S to be searched for and the target syllable confusion network D.

Figure 5G:
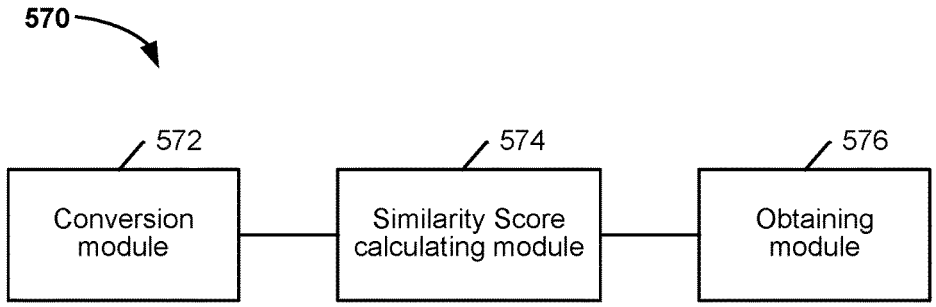
FIG. 5G is a schematic structural diagram of a computer system for performing an audio search in accordance with some implementations.

FIG. 5G is a schematic structural diagram of a computer system 570, such as client device 104, FIGS. 1 and 3, or server system 108, FIGS. 1-2, for performing an audio search in accordance with some implementations. As shown in FIG. 5G, computer system 570 includes a conversion module 572 for converting each audio input into a corresponding target syllable confusion network; and converting an audio input to be searched for or a text to be searched for into a corresponding syllable confusion network to be searched for; a similarity score calculating module 574 for calculating a similarity score between the syllable confusion network to be searched for and each target syllable confusion network; and an obtaining module 576 for obtaining a target audio input that corresponds to a target syllable confusion network with a highest similarity score.

In some implementations, a method of converting an audio input into a syllable confusion network by conversion module 572 includes decoding the target audio input or the audio input to be searched for by using a syllable decoder, to obtain an intermediate result; and converting the intermediate result by using a Lattice conversion tool, to obtain a corresponding syllable confusion network.

In some implementations, a method of converting a text message into a syllable confusion network by conversion module 572 includes partitioning the text to be searched for into multiple words; looking up for syllables corresponding to each word; connecting the found syllables in series, to obtain a syllable sequence $y_1, y_2 \ldots, y_m$, where in the syllable sequence, m is the number of syllables, and $y_i$ (i=1, 2 . . . , m) is a syllable; creating an initial node $V_0$ and an end node $V_{m+2}$; and creating (m+1) intermediate nodes, including $V_1, V_2 \ldots, V_{m+1}$; creating an edge between $V_0$ and $V_1$, setting the syllable label of the edge to an empty label !NULL, and setting the weight of the edge to 1; creating an edge between $V_{m+1}$ and $V_{m+2}$, setting the syllable label of the edge to !NULL, and setting the weight of the edge to 1; sequentially creating an edge for two neighboring intermediate nodes $V_i$ and $V_{i+1}$ (i=1, 2 . . . , m), setting the syllable labels of the edges to $y_1, y_2 \ldots, y_m$ respectively, and setting the weight of each edge to 1.

In some implementations, conversion module 572 may also be used for creating an index for all the syllable confusion networks, including a forward index and an inverted index. The forward index includes a correspondence between all target syllable confusion networks and syllable confusion network identifiers. The inverted index includes syllable confusion network identifiers of target syllable confusion networks to which syllables of the target syllable confusion networks belong, and weights of edges corresponding to the syllables.

In some implementations, a method of calculating a similarity score between the syllable confusion network to be searched for and each target syllable confusion network by the similarity score calculating module 574 includes searching the index of all the target syllable confusion networks, to determine a target syllable confusion network that include all syllables contained in the syllable confusion network to be searched for; generating a corresponding state transition search table according to the syllable confusion network to be searched for, and calculating the similarity between the syllable confusion network to be searched for and each determined target syllable confusion network by using the state transition search table.

In some implementations, a method of calculating the similarity score using the state transition search table by similarity score calculating module 574 includes creating a token for each node of the target syllable confusion network, setting the status of the token to an initial status of the state transition search table, setting the observation of the token to !NULL, setting the weight of the token to 1, and setting the score of the token to 0; performing one or more steps (e.g., steps A-C as previously discussed with respect to Table 1) for each token, to obtain a list of finally surviving tokens, calculating the sum of scores of all tokens in the list of finally surviving tokens, and using the result of the calculation as the similarity between the syllable confusion network to be searched for and the target syllable confusion network. The implementations discussed in the present application can avoid the process of transcribing voice into a word or syllable/phoneme form, thus reduce the error caused therein. The implementations of the present application can improve the accuracy of audio search.

FIGS. 6A-6D illustrate a flowchart diagram of a method 600 for performing an audio search in accordance with some implementations. Method 600 is performed by a computer system, such as client device 104, FIGS. 1 and 3, having one or more processors and memory storing programs (e.g., client-side module 102, FIG. 3) executed by the one or more processors. In some implementations, the computer system that performs method 600 is server system 108, FIGS. 1-2, having one or more processors and memory storing programs (e.g., server-side module 106) executed by the one or more processors. In some implementations, method 600 is governed by instructions that are stored in a non-transitory computer readable storage medium and the instructions are executed by one or more processors (e.g., CPUs 112, FIG. 2, or CPUs 302 of FIG. 3) of the computer system. For ease of explanation, the following describes method 600 as performed by a client device (e.g., client device 104, FIGS. 1 and 3). However, those skilled in the art will appreciate that in other implementations, one or more of the operations described in method 600 are performed by a server system (e.g., server system 108, FIGS. 1-2).

Figure 6A:
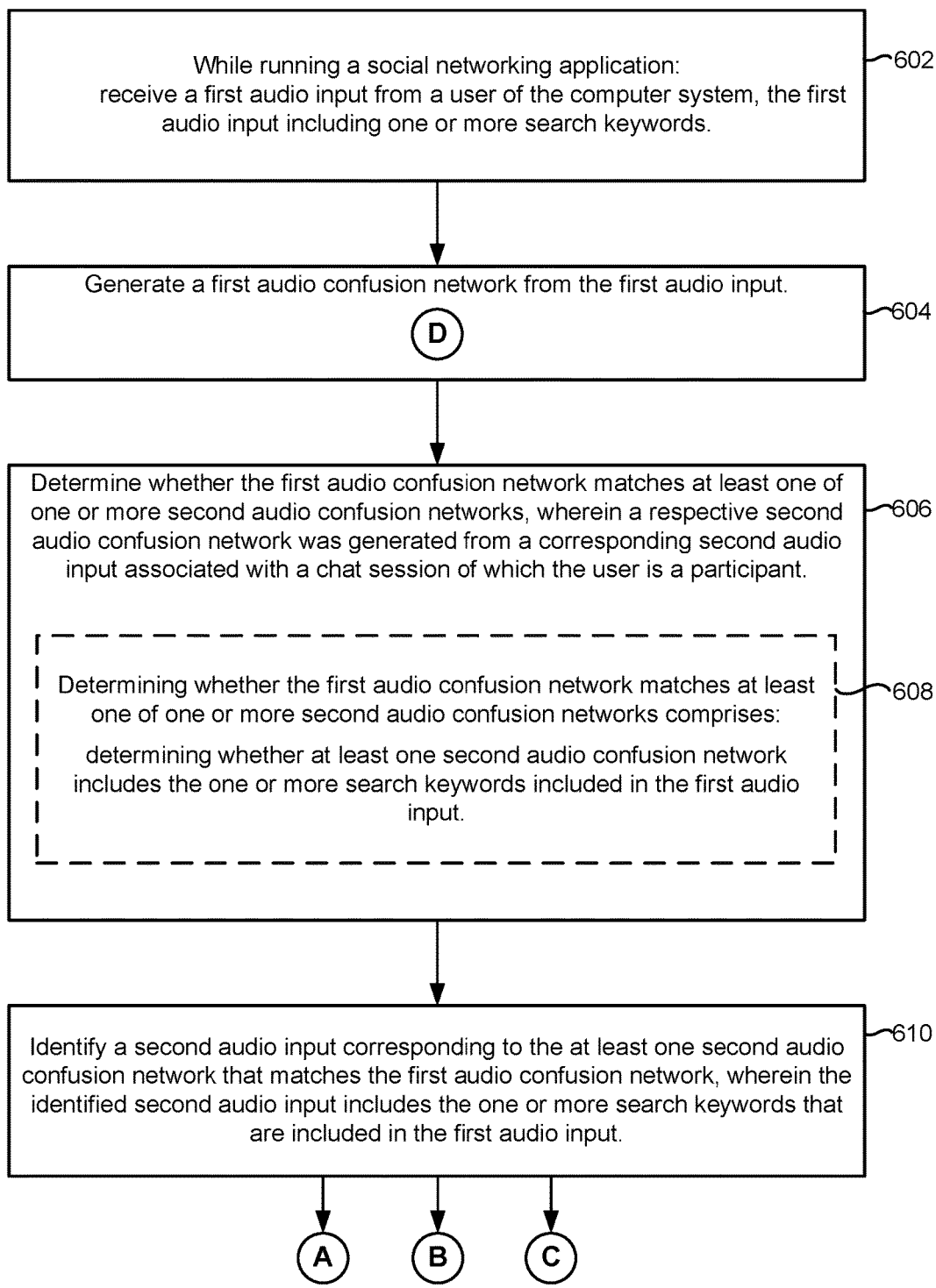
FIGS. 6A-6D are a flowchart diagram of a method for performing an audio search in accordance with some implementations.

Referring to FIG. 6A, while running a social networking application, a computer system (e.g., receiving module 336 of FIG. 3) receives (602) a first audio input (e.g., audio input 408, FIGS. 4A-4D) from a user (e.g., user 406, FIGS. 4A-4D) of the computer system. In some implementations as discussed with respect to FIG. 4A, the first audio input includes one or more search keywords. The computer system (e.g., generating module 334, FIG. 3) generates (604) a first audio confusion network from the first audio input.

Figure 6B:
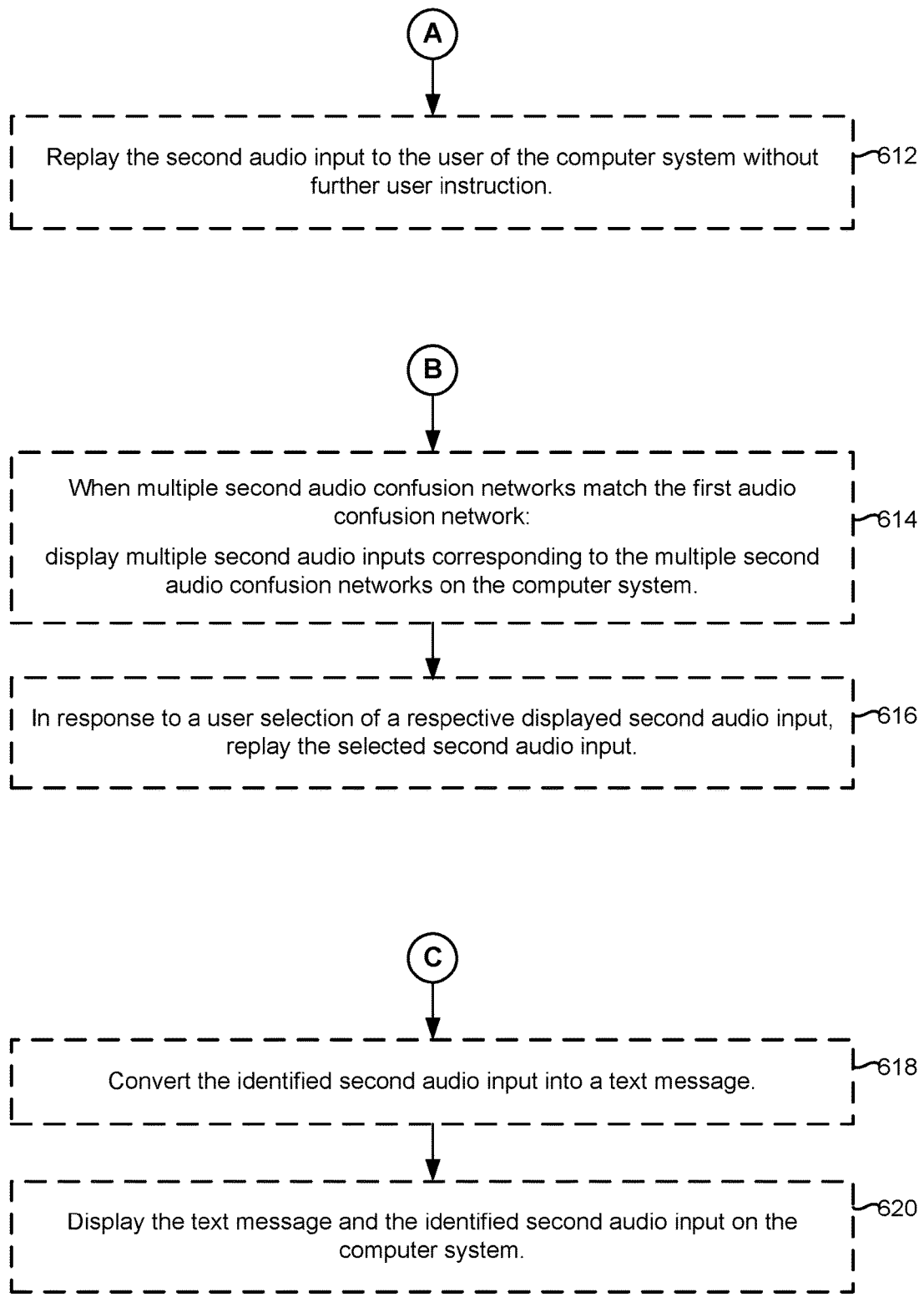
Figure 6C:
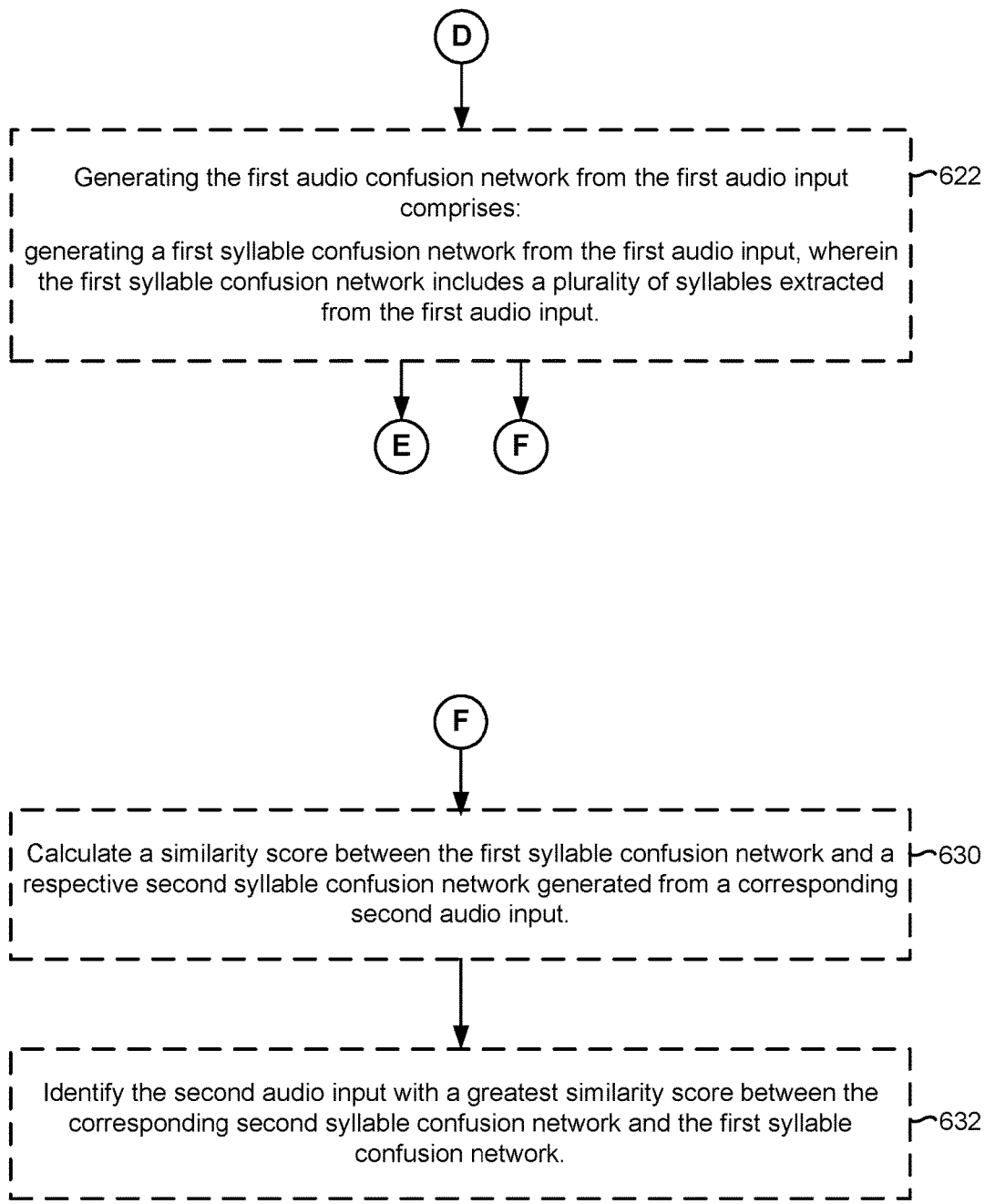

Referring to FIG. 6C, in some implementations, the step of generating the first audio confusion network from the first audio input comprises generating (622) a first syllable confusion network from the first audio input. The first syllable confusion network includes a plurality of syllables extracted from the first audio input.

Figure 6D:
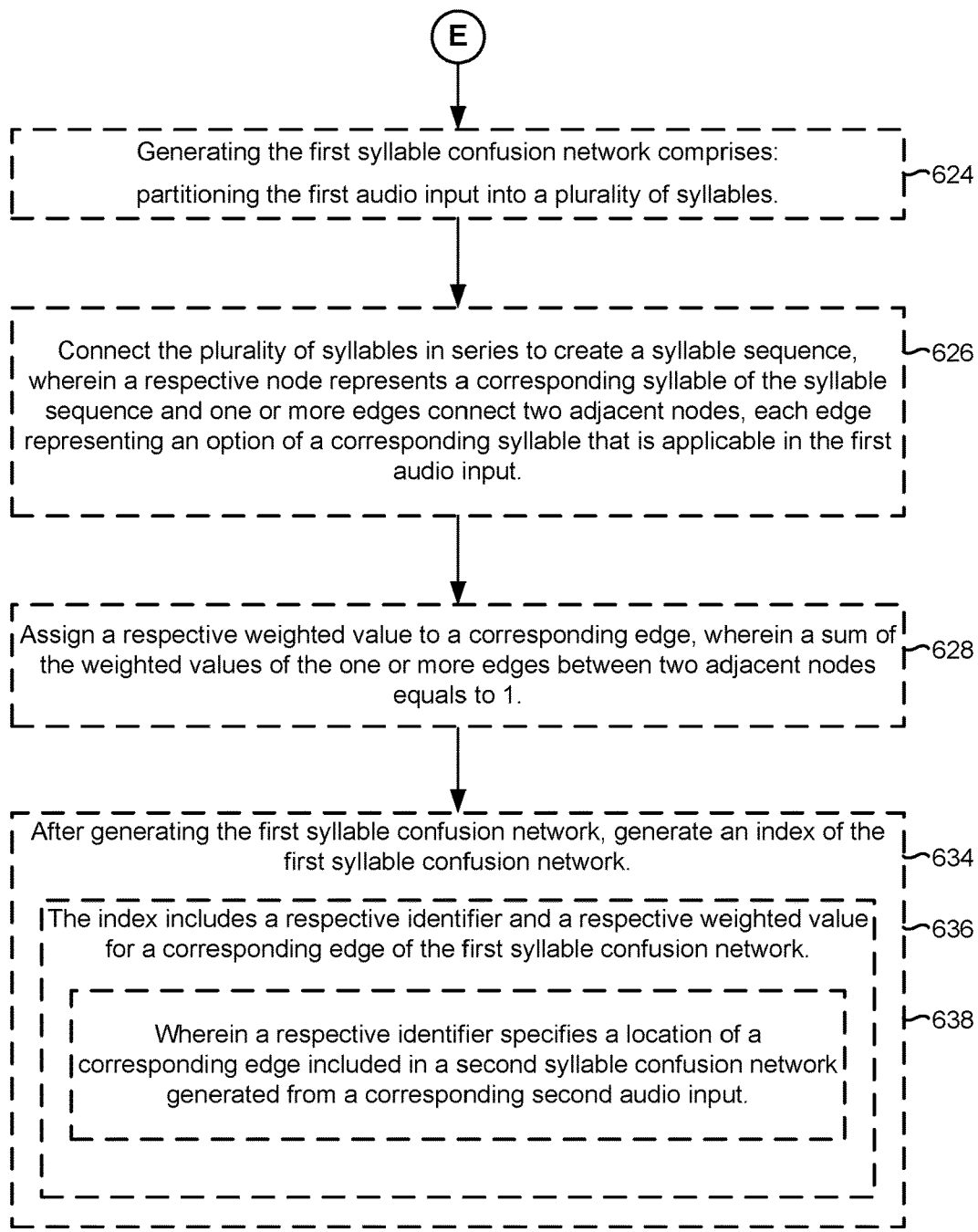

Referring to FIG. 6D, in some implementations, the computer system partitions (624) the first audio input into a plurality of syllables. The computer system connects (626) the plurality of syllables in series to create a syllable sequence. A respective node represents a corresponding syllable of the syllable sequence. One or more edges connect two adjacent nodes, and each edge represents an option of a corresponding syllable that is applicable in the first audio input. In some implementations, a syllable may have more than one option to be applicable in the audio input, for example, different tones of a syllable may be valid in the audio input to provide different meanings. The computer system assigns (628) a respective weighted value to a corresponding edge, a sum of the weighted values of the one or more edges between two adjacent nodes equaling to 1.

In some implementations, after generating the first syllable confusion network, the computer system generates (634) an index of the first syllable confusion network. In some implementations, the index includes (636) a respective identifier and a respective weighted value for a corresponding edge of the first syllable confusion network. In some implementations, a respective identifier specifies (638) a location of a corresponding edge included in a second syllable confusion network generated from a corresponding second audio input.

Referring back to FIG. 6C, in some implementations, the computer system calculates (630) a similarity score between the first syllable confusion network and a respective second syllable confusion network generated from a corresponding second audio input. In some implementations, the computer system identifies (632) the second audio input with a greatest similarity score between the corresponding second syllable confusion network and the first syllable confusion network.

Referring back to FIG. 6A, the computer system (e.g., the searching module 338, FIG. 3) determines (606) whether the first audio confusion network matches at least one of one or more second audio confusion networks. In some implementations, a respective second audio confusion network was generated from a corresponding second audio input (e.g., from audio inputs 404, FIG. 4A) associated with a chat session of which the user is a participant.

In some implementations, the step of determining (606) whether the first audio confusion network matches at least one of one or more second audio confusion networks further comprises determining (608) whether at least one second audio confusion network includes the one or more search keywords included in the first audio input. In some implementations, the matched second audio confusion network may include the one or more search keywords.

In the method 600, the computer system identifies (610) a second audio input (e.g., audio input 412, FIG. 4B) corresponding to the at least one second audio confusion network that matches the first audio confusion network. In some implementations, the identified second audio input includes the one or more search keywords that are included in the first audio input.

Referring to FIG. 6B, in some implementations, the computer system replays (612) the second audio input to the user of the computer system without further user instruction (e.g., FIG. 4B). In some implementations, when multiple second audio confusion networks match the first audio confusion network, the computer system displays (614) multiple second audio inputs corresponding to the multiple second audio confusion networks on the computer system (e.g., FIG. 4C). In some implementations, in response to a user selection of a respective displayed second audio input, the computer system replays (616) the selected second audio input (e.g., FIG. 4C). For example, the instruction from the user may include tapping on a blurb corresponding to the second audio input as the user's selection as shown in FIG. 4C.

In some implementations, the computer system converts (618) the identified second audio input into a text message. The computer system displays (620) the text message and the identified second audio input on the computer system as shown in FIG. 4D. This feature can be useful when a user can quickly glance at the text message, and select to play the audio message only if there is anything unclear from the text message.

Each of the methods described herein is typically governed by instructions that are stored in a computer readable storage medium and that are executed by one or more processors of one or more servers or client devices. The above identified modules or programs (i.e., sets of instructions) need not be implemented as separate software programs, procedures or modules, and thus various subsets of these modules will be combined or otherwise re-arranged in various implementations.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for performing an audio search, comprising:
   at a computer system having one or more processors and memory and a display:
   while running a social networking application:
      receiving a first audio input from a user of the computer system;
      generating a first audio confusion network from the first audio input;
      comparing the first audio confusion network with one or more second audio confusion networks, wherein a respective second audio confusion network corresponds to a second audio input associated with one of a plurality of participants of a chat session of the social networking application and the user is one of the plurality of participants of the chat session;
      identifying at least one second audio input corresponding to the at least one second audio confusion network that matches the first audio confusion network; and
      displaying a portion of the chat session including a visual icon representing the identified second audio input in a first region of the display.

2. The method of claim 1, wherein comparing the first audio confusion network with one or more second audio confusion networks comprises:
   determining whether at least one second audio confusion network includes one or more search keywords included in the first audio input.

3. The method of claim 1, further comprising:
   replaying the second audio input to the user of the computer system without further user instruction.

4. The method of claim 1, further comprising:
   when multiple second audio confusion networks match the first audio confusion network:
      displaying multiple visual icons in the first region of the display, each visual icon representing a respective second audio input corresponding to one of the multiple second audio confusion networks on the computer system; and
      replaying the selected second audio input in response to a user selection of a respective displayed second audio input on the display.

5. The method of claim 4, wherein the multiple visual icons represent second audio inputs associated with at least two different chat sessions of which the user is a participant.

6. The method of claim 1, further comprising:
   converting the identified second audio input into a text message; and
   replacing the visual icon corresponding to the second audio input with the text message in the first region of the display.

7. The method of claim 6, further comprising:
   replaying the second audio input in response to a user selection of the text message on the display.

8. The method of claim 1, wherein a visual icon corresponding the first audio input is displayed in a first region of the display and the first region of the display is visually separated from the second region of the display.

9. A computer system, comprising:
   one or more processors;
   a display; and
   memory storing one or more programs to be executed by the one or more processors, the one or more programs comprising instructions for:

while running a social networking application:
    receiving a first audio input from a user of the computer system;
    generating a first audio confusion network from the first audio input;
    comparing the first audio confusion network with one or more second audio confusion networks, wherein a respective second audio confusion network corresponds to a second audio input associated with one of a plurality of participants of a chat session of the social networking application and the user is one of the plurality of participants of the chat session;
    identifying at least one second audio input corresponding to the at least one second audio confusion network that matches the first audio confusion network; and
    displaying a portion of the chat session including a visual icon representing the identified second audio input in a first region of the display.

10. The computer system of claim 9, wherein the instruction for comparing the first audio confusion network with one or more second audio confusion networks comprises:
    determining whether at least one second audio confusion network includes one or more search keywords included in the first audio input.

11. The computer system of claim 9, wherein the one or more programs further comprise instructions for:
    replaying the second audio input to the user of the computer system without further user instruction.

12. The computer system of claim 9, wherein the one or more programs further comprise instructions for:
    when multiple second audio confusion networks match the first audio confusion network:
        displaying multiple visual icons in the first region of the display, each visual icon representing a respective second audio input corresponding to one of the multiple second audio confusion networks on the computer system; and
        replaying the selected second audio input in response to a user selection of a respective displayed second audio input on the display.

13. The computer system of claim 12, wherein the multiple visual icons represent second audio inputs associated with at least two different chat sessions of which the user is a participant.

14. The computer system of claim 9, wherein the one or more programs further comprise instructions for:
    converting the identified second audio input into a text message; and
    replacing the visual icon corresponding to the second audio input with the text message in the first region of the display.

15. The computer system of claim 14, wherein the one or more programs further comprise instructions for:
    replaying the second audio input in response to a user selection of the text message on the display.

16. The computer system of claim 9, wherein a visual icon corresponding the first audio input is displayed in a first region of the display and the first region of the display is visually separated from the second region of the display.

17. A non-transitory computer readable storage medium storing one or more programs, the one or more programs comprising instructions, which, when executed by a computer system having one or more processors and a display, cause the computer system to perform operations comprising:
    while running a social networking application:
        receiving a first audio input from a user of the computer system;
        generating a first audio confusion network from the first audio input;
        comparing the first audio confusion network with one or more second audio confusion networks, wherein a respective second audio confusion network corresponds to a second audio input associated with one of a plurality of participants of a chat session of the social networking application and the user is one of the plurality of participants of the chat session;
        identifying at least one second audio input corresponding to the at least one second audio confusion network that matches the first audio confusion network; and
        displaying a portion of the chat session including a visual icon representing the identified second audio input in a first region of the display.

18. The non-transitory computer readable storage medium of claim 17, wherein the operation for comparing the first audio confusion network with one or more second audio confusion networks comprises:
    determining whether at least one second audio confusion network includes one or more search keywords included in the first audio input.

19. The non-transitory computer readable storage medium of claim 17, wherein the operations further comprise:
    converting the identified second audio input into a text message; and
    replacing the visual icon corresponding to the second audio input with the text message in the first region of the display.

20. The non-transitory computer readable storage medium of claim 19, wherein the operations further comprise:
    replaying the second audio input in response to a user selection of the text message on the display.

* * * * *